United States Patent
Kitze et al.

(10) Patent No.: US 9,356,782 B2
(45) Date of Patent: May 31, 2016

(54) BLOCK ENCRYPTION

(71) Applicant: Unsene, Inc., Incline Village, NV (US)

(72) Inventors: Christopher A. Kitze, Mill Valley, CA (US); Vinh H. Vo, San Jose, CA (US)

(73) Assignee: Unsene, Inc., Incline Village, NV (US)

( * ) Notice: Subject to any disclaimer, the term of this patent is extended or adjusted under 35 U.S.C. 154(b) by 468 days.

(21) Appl. No.: 13/832,286

(22) Filed: Mar. 15, 2013

(65) Prior Publication Data
US 2014/0281513 A1    Sep. 18, 2014

(51) Int. Cl.
*H04L 29/06* (2006.01)
*H04L 9/14* (2006.01)
*H04L 9/08* (2006.01)

(52) U.S. Cl.
CPC ............. *H04L 9/14* (2013.01); *H04L 9/0897* (2013.01)

(58) Field of Classification Search
None
See application file for complete search history.

(56) References Cited

U.S. PATENT DOCUMENTS

2011/0225417 A1* 9/2011 Maharajh et al. ............ 713/150
2013/0305039 A1* 11/2013 Gauda ........................... 713/153

* cited by examiner

*Primary Examiner* — Brandon Hoffman
(74) *Attorney, Agent, or Firm* — Withrow & Terranova, PLLC

(57) ABSTRACT

A method of storing a file is provided. The method includes splitting the file into a plurality of file chunks and encrypting each file chunk of the plurality of file chunks. The method also includes generating a first security key that decrypts a first encrypted file chunk of the plurality of encrypted file chunks and storing ones of the plurality of encrypted file chunks at a second location separate and distinct from the first location. The method also includes storing a second security key that decrypts a second encrypted file chunk of the plurality of file chunks at the first encrypted file chunk where access is gained to the second security key when the first encrypted file chunk is decrypted using the first security key.

13 Claims, 9 Drawing Sheets

BLOCK ENCRYPTION

FIELD OF THE DISCLOSURE

The present disclosure generally relates to storing files and more particularly to securely storing chunks of files in different locations.

BACKGROUND

In computer data storage, a redundant array of inexpensive disks (RAID) stores data across multiple disk drive components, where the array of disks are treated as a single large expensive disk. In RAID systems, data is stored across different drives using various RAID levels. In one implementation, data is sequentially striped onto different drives. Specifically, data from a single file is split using a RAID algorithm and then striped across the RAID. In some instances, the data may be striped to numerous digital data storage devices, such as hard drives, RAM, memory sticks, a dropbox, or even a cloud. In this implementation, when data is sequentially striped, data may be concurrently accessed, thereby reducing the time associated with retrieving large files.

Data striping presents a number of problems in relation to the data that is stored across the RAID. First, the algorithm that is used for data striping is publicly available. Second, once the data is split and stored across the RAID, the data is not secured in any manner. Thus, anyone can access the unsecured data, and with the algorithm, reconstruct the data that is stored across the RAID. Accordingly, what is needed is a method and system that securely stores data across various drives. The method and system should allow for the storing of related data across any type of storage such that the stored data is not accessible by an unauthorized party.

SUMMARY

Embodiments of the present disclosure relate to enhancing security associated with a file stored in various locations. In one embodiment, a file is divided into file chunks and each of the file chunks are encrypted in accordance with any type of encryption protocol. In some embodiments, each of the file chunks has the same type of encryption; and in other embodiments, the file chunks have different types of encryption. In an embodiment, the file chunks are sequential. In an embodiment where the file chunks are sequential, a first encrypted file chunk may store a security key to decrypt a second encrypted file chunk. Thus, when the first encrypted file chunk is decrypted, access is gained to the security key that decrypts the second encrypted file chunk. In other embodiments, the keys for decrypting the encrypted file chunks may be stored remotely from the encrypted file chunks. In further embodiments, a universal security key may be used to decrypt all of the file chunks. In some embodiments, when the file is divided into file chunks, a metadata file is created which stores information about the file chunks, such as a storage location of the blocks and the order in which the file chunks should be placed in order to generate the file. In some embodiments, the file chunks are remotely stored from each other across a public network, and the metadata file stores the locations of the remotely stored file chunks.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
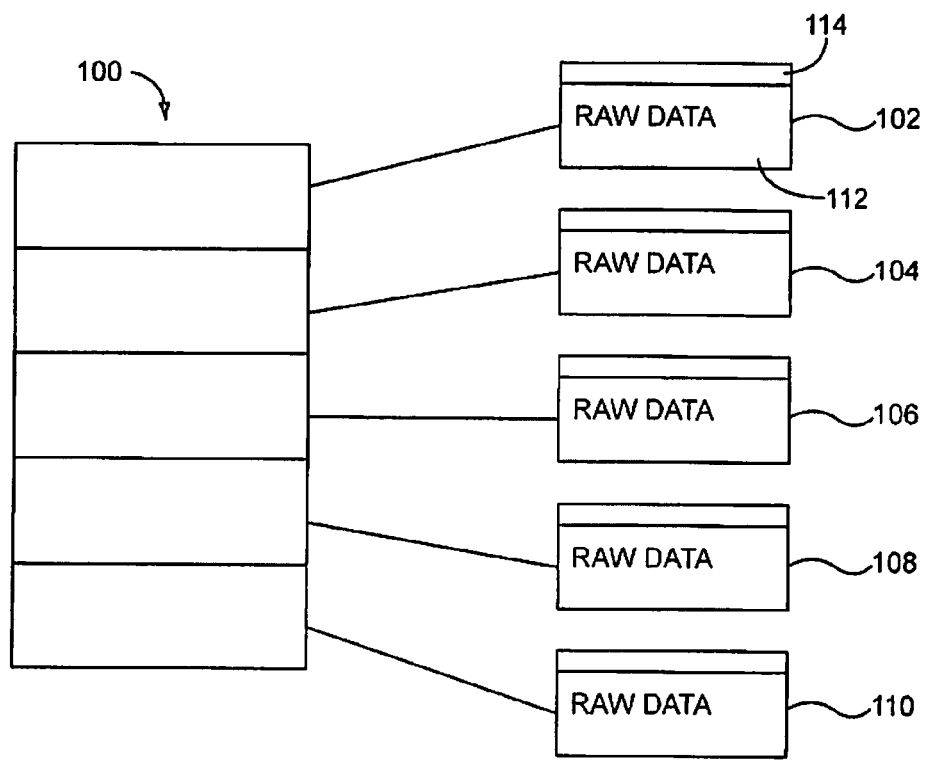
FIG. 1 illustrates a file having file chunks in accordance with an embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the present disclosure relate to enhancing security associated with a file stored in various locations. In one embodiment, a file is divided into file chunks and each of the file chunks are encrypted in accordance with any type of encryption protocol. In some embodiments, each of the file chunks has the same type of encryption; and in other embodiments, the file chunks have different types of encryption. In an embodiment, the file chunks are sequential. In an embodiment where the file chunks are sequential, a first encrypted file chunk may store a security key to decrypt a second encrypted file chunk. Thus, when the first encrypted file chunk is decrypted, access is gained to the security key that decrypts the second encrypted file chunk. In other embodiments, the keys for decrypting the encrypted file chunks may be stored remotely from the encrypted file chunks. In some embodiments, when the file is divided into file chunks, a metadata file is created, which stores information about the file chunks, such as a storage location of the blocks and the order in which the file chunks should be placed in order to generate the file. In some embodiments, the file chunks are remotely stored from each other such that the file is not stored at a single location, and the metadata file stores the locations of the remotely stored file chunks.

Turning to the Figures and FIG. 1, a file 100 that has been divided into file chunks 102-110 is shown. The file 100 may be any type of file, such as a document, an image file, a multimedia file, or the like. The file 100 may be split into the file chunks 102-110 using any well known technique. For example, the files are chunked using a fixed length or a variable length of between about 128 bytes to 128 Gigabytes. In addition, the fixed or variable length could be about 256K. Each of the file chunks 102-110 includes raw data 112 and an encryption header 114. The raw data 112 corresponds to actual contents of the file 100 and the file chunk 102, such as a portion of an image, a portion of a word processing document, or the like. The encryption header 114 provides information relating to the type of security used for the file chunk 102. In particular, when the file 100 is split into the file chunks 102-110, each of the file chunks 102-110 are encrypted with a security protocol for added security.

In accordance with an embodiment of the present disclosure, the file chunks 102-110 may be encrypted using any type of encryption algorithm. Examples of encryption types include a security protocol in accordance with the Advanced Encryption Standard (AES) Specification, the Secure Socket Layer (SSL), and Transport Layer Security (TLS) protocols. Thus, in these examples, the encryption header 114 includes information indicating that the file chunk is encrypted with one of AES, SSL, or TLS. In some embodiments, different files chunks may have different types of encryption. For example, in these embodiments, the file chunk 102 may be encrypted according to AES, the file chunk 104 may be encrypted according to SSL, and the file chunks 106-110 may be encrypted according to TLS. It should be noted that any type of encryption may be used and any combination of different encryption types for each of the file chunks 102-110 may be used.

Figure 2:
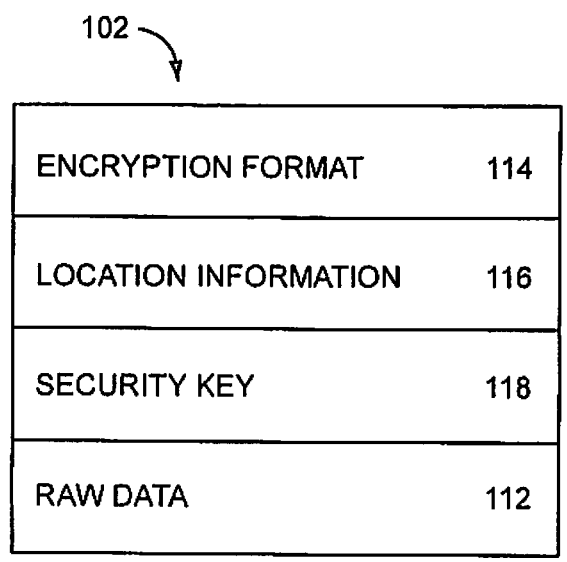
FIG. 2 depicts a file chunk shown with reference to FIG. 1 in greater detail.

Making reference to FIG. 2, the file chunk 102 is shown in more detail in accordance with an embodiment of the present disclosure. Here, the file chunk 102 includes location information 116 and a security key 118. It should be noted that inclusion of both the location information 116 and security key 118 in the file chunk 102 is optional. The location information 116 has information relating to where the next file chunk, such as the file chunk 104 is located. The security key 118 is the security key that may be used to decrypt the file chunk 104. Thus, in one embodiment of the present disclosure, when the file chunk 102 is decrypted, access to the location of another file chunk and access to the security key needed to decrypt the next file chunk is obtained. As noted above, embodiments of the present disclosure split a file into file chunks, encrypt the file chunks, and then store the encrypted file chunks in various locations. In order to assemble the file with the file chunks, a security key is obtained that provides access to the encrypted file chunks. As will be detailed further on, in accordance with an embodiment of the present disclosure, the security keys may be stored in any location that is accessible by a device requesting a file that comprises the file chunks.

Figure 3:
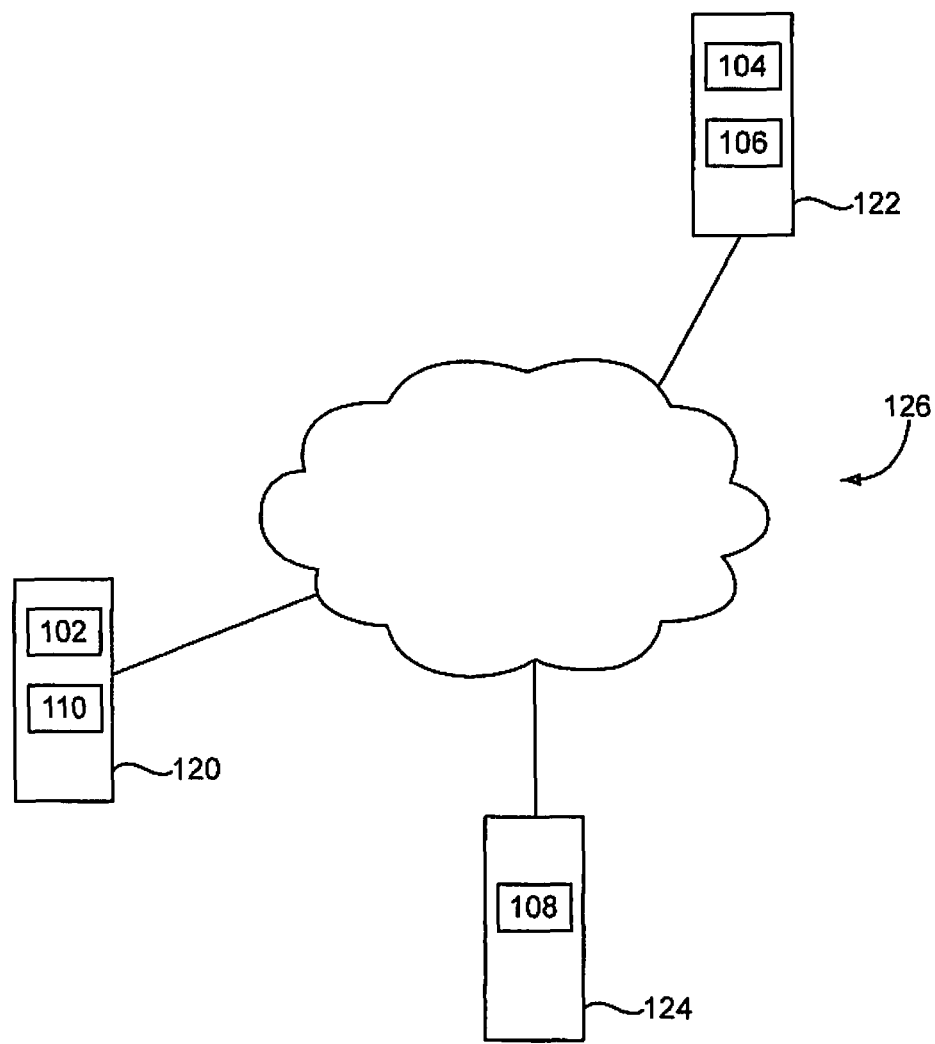
FIG. 3 is an embodiment of the present disclosure showing where different file chunks of a file may be stored in a cloud based network.

The file chunks 102-110 may be stored at different locations as shown with reference to FIG. 3. In this embodiment, the file chunks 102-110 are variously stored at devices 120-124 that are part of a cloud based operating system 126. In one embodiment of the present disclosure, the devices 120-124 may be any type of device, such as a computing device, including a work station, a desktop or laptop computer, or a tablet computer. In addition, each of the devices 120-124 may be a mobile computing device including, but not limited to, the Apple® iPhone, the Palm Pre, the Samsung Rogue, the Blackberry Storm, and the Apple® iPod Touch®. In this embodiment, the file chunks 102 and 110 are stored at the device 120 and the file chunks 104 and 106 are stored at the device 122. Moreover, the file chunk 108 is stored at the device 124. It should be noted that any of the file chunks 102-110 may be stored at any of the devices 120-124. Moreover, one of the devices 120-124 may store all of the file chunks 102-110. As such, the present disclosure may be implemented into any type of cloud based architecture, such as the cloud based network 126. Thus, embodiments of the present disclosure may distribute files, and portions of files, such as the file chunks throughout a public network. Moreover, in instances where files are large, such as a terabyte, the file may be split up into smaller portions and saved throughout a public network.

Figure 4:
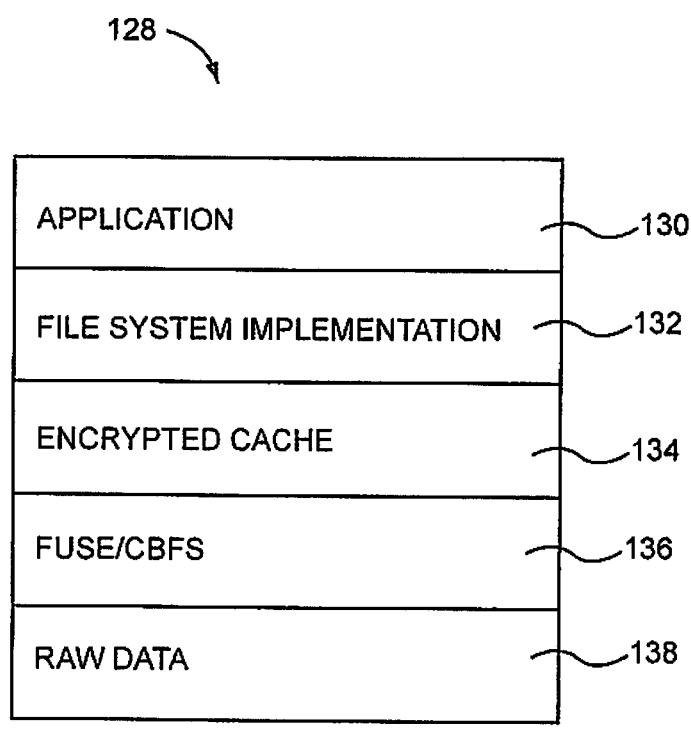
FIG. 4 illustrates a protocol stack for an embodiment of the present disclosure that uses a cloud based network.

In an embodiment of the present disclosure that uses the cloud based network, embodiments of the present disclosure may implement a protocol stack 128 as shown with respect to FIG. 4. Here, the protocol stack includes layers 130-138. The layer 130 is an application layer which corresponds to the application that is requesting a file, such as the file 100. Examples of applications include a data processing application, such as a word processor, an image processing application, such as Adobe® Photoshop® or the like, or any other type of processing application. A file system implementation layer 132 and an encrypted cache layer 134 provide the functionality disclosed herein. In addition, a FUSE/CBFS layer 136 and a raw data layer 138 implement the functionality associated with a cloud based network, such as the cloud based network 126.

Figure 5:
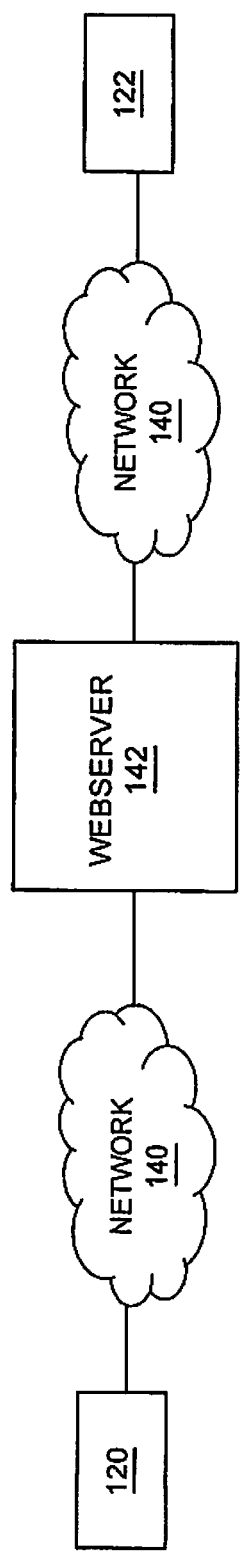
FIG. 5 is an embodiment of the present disclosure that shows the storage of file chunks on a webserver.

In an embodiment, the devices 120-124 may communicate via network 140, such as the Internet with a webserver 142 as shown with reference to FIG. 5. In this embodiment, the file chunks 102-110 may be stored on the webserver 142. Here, the file chunks 102-110 are centrally stored on the webserver 142 and each of the devices 120-124 may access the file chunks 102-110 from the webserver 142.

Figure 6:
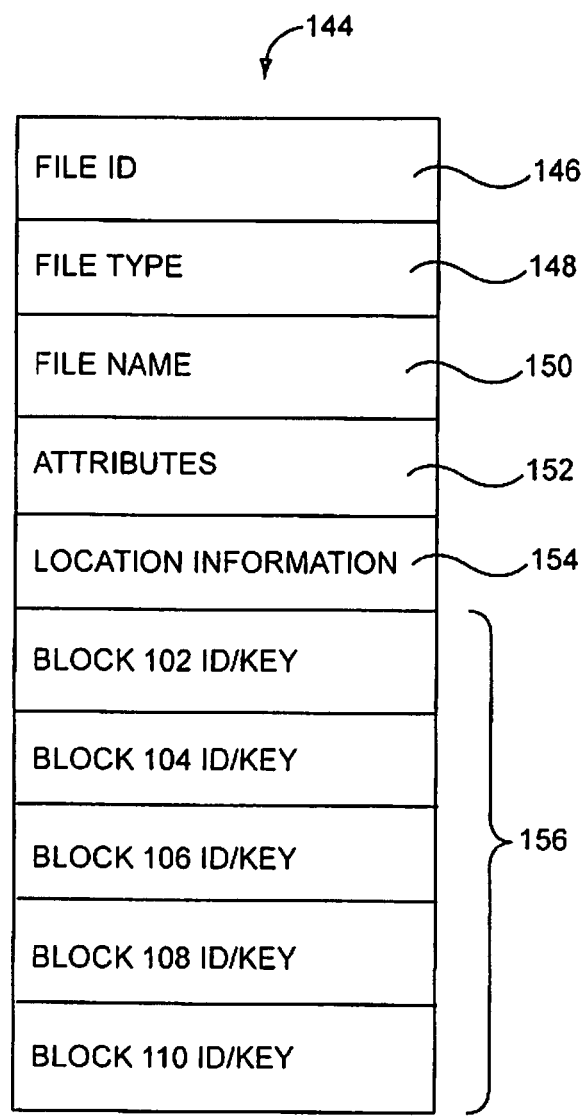
FIG. 6 depicts a metadata file in accordance with an embodiment of the present disclosure.

After the file chunks 102-110 are created and assigned to a particular storage location, such as one of the devices 120-124, a metadata file 144 is generated that stores information about the file chunks 102-110, as shown with reference to FIG. 6. The metadata file 144 includes various information about the file chunks 102-110, such as a file ID 146, a file type 148, a file name 150 and attributes 152. In addition, the metadata file 144 includes location information 154 and IDs and security keys generally denoted at 156 for each of the file chunks 102-110.

The file ID 146 relates to identification indicia for the file 100, and the file type 148 indicates that the file 100 may be any type of file, such as a document, an image file, a multimedia file, or the like. The IDs and security keys 156 have two functions. First, the IDs and security keys 156 disclose an order in which the file chunks 102-110 should be assembled to generate the file 100. Second, the IDs and security keys indicate information indicia for each of the file chunks 102-110 and also, in one embodiment, include the security keys necessary to decrypt to the file chunks 102-110. Thus, in one embodiment of the present disclosure, the security keys needed to access the file chunks are provided from the metadata file 144. The location information 154 provides a storage location of the file chunks. In some embodiments, the location information 154 may only provide the storage location of the first file chunk, where the first file chunk and the remaining file chunks include the storage location information for the other file chunks. In some embodiments, the location information 154 may provide the storage location of a few of the file chunks, but not all of the file chunks, where other file chunks have the storage locations of the remaining file chunks. In further embodiments, the location information 154 may include storage location of all the file chunks of a file.

In accordance with embodiments of the present disclosure, the metadata file 144 is also sent to a user who may access the encrypted files. In these embodiments, communication is established between the entity that stores the metadata file 144 and the intended recipient of the metadata file 144 prior to sending the metadata file. For example, communication may be first established using a RSA algorithm in order to establish a secure communication link between the entity that stores the metadata file 144 and the intended recipient of the metadata file 144. In addition, the metadata file 144 is sent to the intended recipient using any type of any type of security, such as a security protocol in accordance with the Advanced Encryption Standard (AES) Specification. Moreover, in some embodiments, the metadata file 144 may be sent in an unencrypted format, such as storing the metadata file 141 on a memory stick or any other type of portable storage device.

As noted above, the security keys for decrypting the file chunks 102-120 may be stored at any location. For example, the security keys may reside at the requesting device, such as one of the devices 120-124, a central server, such as the webserver 142, or, as noted above, with the file chunks themselves. Moreover, different security keys for different file chunks of the same file may be stored at different locations. For example, in one embodiment, for the file 100, the security key for the file chunk 102 may be stored at the requesting device, such as one of the devices 120-124, a central server, such as the webserver 142, or at the file chunk 102. In this same embodiment, the security key for the file chunk 104 may be stored at the requesting device, such as one of the devices 120-124, a central server, such as the webserver 142, or at the file chunk 102. In a further embodiment, a universal security key may be used to access all file chunks for a file, where a layer of security, in addition to the passcode noted above, is used to access the security key.

Figure 7:
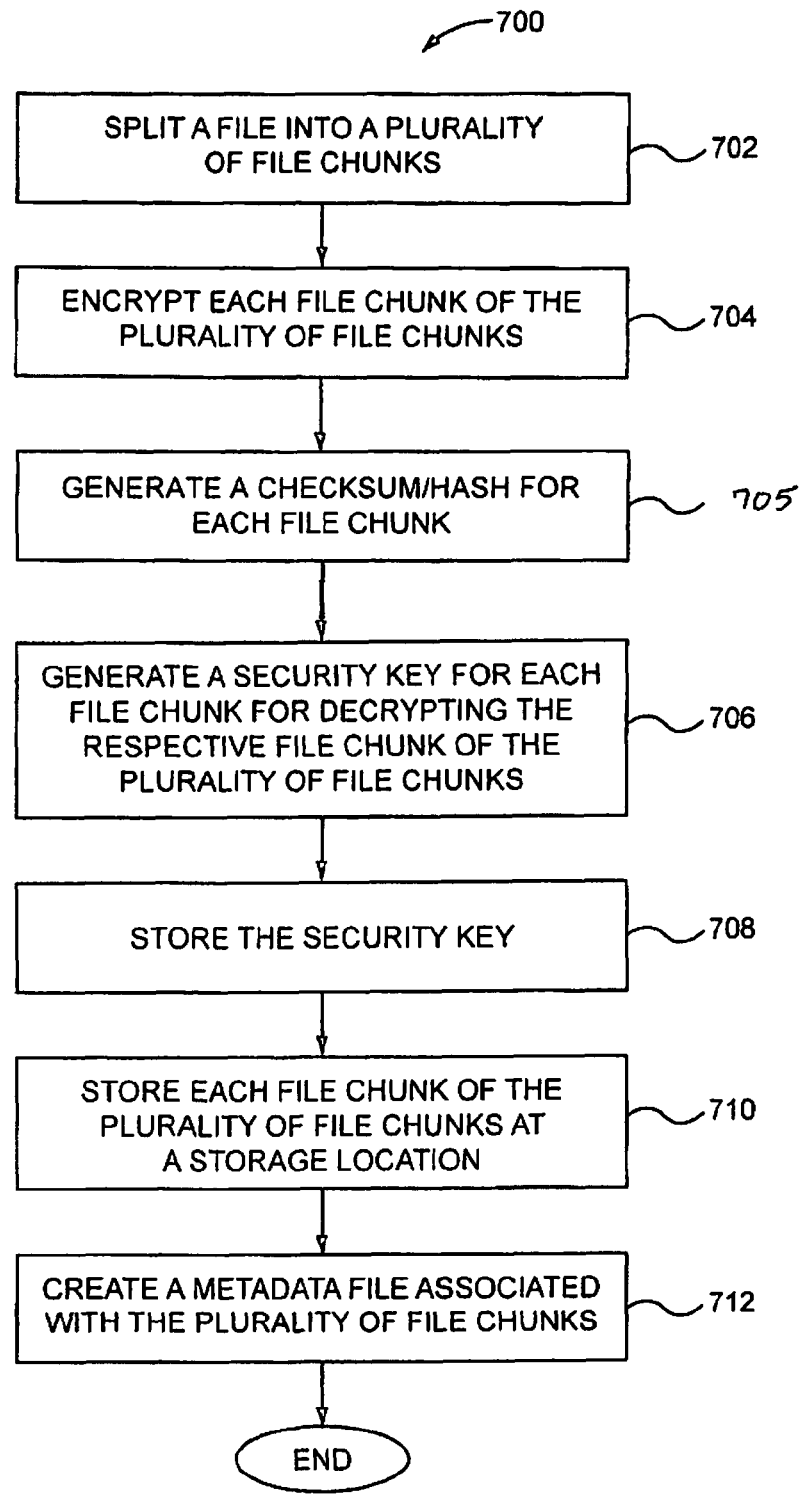
FIG. 7 illustrates a method for splitting a file into a plurality of file chunks, encrypting each file chunk, and then storing the file chunks in various locations in accordance with an embodiment of the present disclosure.

As detailed above, embodiments of the present disclosure relate to enhancing security associated with a file stored in various locations where a file is split into file chunks, encrypted, and stored in various locations. FIG. 7 illustrates a method 700 for splitting a file into a plurality of file chunks, encrypting each file chunk, and then storing the file chunks in various locations in accordance with an embodiment of the present disclosure. Initially, a file, such as the file 100, is split into a plurality of file chunks, such as the file chunks 102-110, using any technique as previously mentioned, in an operation 702.

After the file is split into the file chunks, each file chunk of the plurality of file chunks is encrypted in accordance with any type of security protocol in an operation 704. Examples of security protocols that may be used include AES, SSL, and TLS. For example, after the file chunks 102-110 are created, each of the file chunks 102-110 is encrypted using one of the AES, SSL, and TLS security protocols. It should be noted that in alternative embodiments of the disclosure, each of the file chunks 102-110 may be encrypted in accordance with different security protocols. Thus, the file chunks 102 and 104 may be encrypted in accordance with the AES protocol, the file chunk 106 may be encrypted in accordance with the SSL protocol, and the file chunks 108 and 110 may be encrypted in accordance with the TLS protocol. In one embodiment, after the file is chunked and encrypted, a checksum/hash may be associated with each chunked file in a fashion similar to a secure hash algorithm in order to provide an added layer of security in an operation 705.

After each of the file chunks are encrypted in the operation 704, a security key is generated for each file chunk of the plurality of file chunks in an operation 706. The security key is used to decrypt the encrypted file chunk. Thus, the contents of the file chunk cannot be accessed without the security key. In one embodiment of the present disclosure, during the operation 706, a passcode for providing access to the security key may also be generated. Here, in order to access the security key, the proper passcode must be provided. In accordance with various embodiments of the present disclosure, a single security key may be generated, which may be used to access all of the file chunks, or multiple security keys may be generated to access the file chunks. For example, each of the file chunks 102-110 may have their own security keys 118 which are different from each other. In this embodiment, in order to access each of the file chunks 102-110, a user must have each of the security keys 118. In some embodiments, a checksum/hash may also be generated for each security key in order to provide added security.

In accordance with various embodiments of the present disclosure, a number of file chunks of a file may share the same security key while other file chunks of the file may share a different security key. To further illustrate, each of the file chunks 102-106 may share a single security key while the file chunks 108 and 110 may share another security key, which is different from the security key shared by the file chunks 102-106. Thus, in order to access the file chunks 102-106, a user must provide the proper passcode for the security key that decrypts the file chunks 102-106. In addition, in order to access the file chunks 108 and 110, a user must provide the proper passcode for the security key that decrypts the file chunks 108 and 110. In this example, during the operation 706, a security key for the file chunks 102-106 will be generated and a security key for the file chunks 108 and 110 will be generated.

After the operation 706, the security key is stored in an operation 708. In various embodiments, the security key may be stored with the file chunks themselves, as discussed above with reference to FIG. 2, or the security key may be remotely stored from the file chunks, such as the webserver 142 or the metadata file 144.

In addition, the file chunks themselves are stored at a storage location in an operation 710. In particular, as detailed above, each of the file chunks may be stored in separate locations, such as the devices 120-124, such that the file chunks are remotely stored from one another. Moreover, each of the file chunks are stored in an encrypted format, thereby minimizing the possibility of unauthorized parties gaining access to the file chunks. It should be noted that while the operation 710 is shown as occurring after the operation 708, in alternative embodiments, the operation 710 may occur before the operation 708. Furthermore, the operation 708 may be combined with the operation 710.

After the operations 708 and 710 are performed, an operation 712 is performed, where a metadata file that is associated with the plurality of chunked files is created. As detailed above with respect to FIG. 4, the metadata file 144 stores various information regarding the file chunks, such as the sequence of the file chunks, where the sequence dictates the order in which the file chunks must be to create the file and, in some embodiments, the location of the file chunks.

Figure 8:
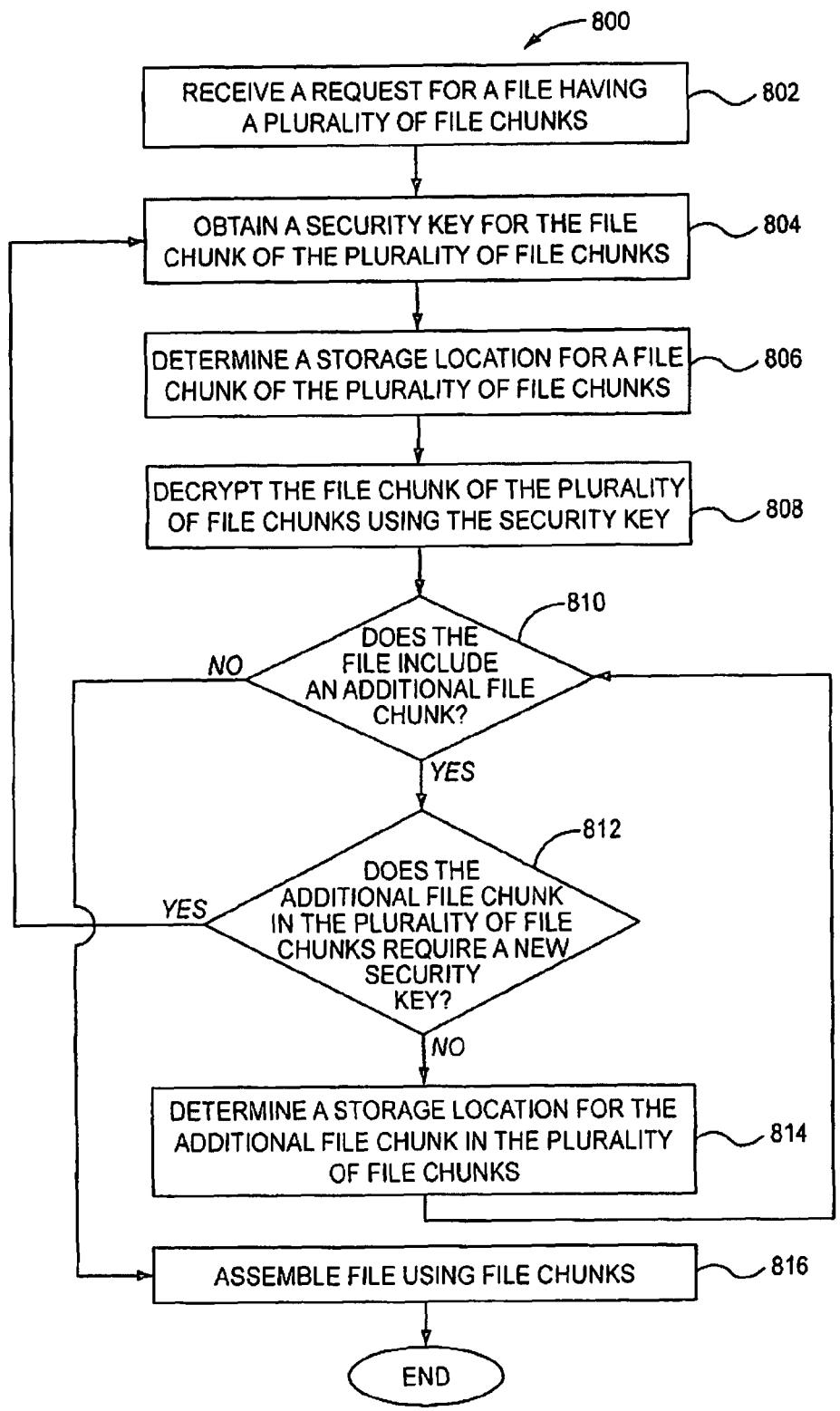
FIG. 8 illustrates a method for retrieving encrypted file chunks in order to access a file in accordance with an embodiment of the present disclosure.

Embodiments of the present disclosure also provide a method for retrieving encrypted file chunks, as shown with reference to FIG. 8, which illustrates a method 800 for retrieving encrypted file chunks in order to access a file in accordance with an embodiment of the present disclosure. Turning to FIG. 8, initially, a request for a file that has been stored as a plurality of encrypted file chunks is received in an operation 802. In response to receiving the request, a security key for decrypting the first file chunk of the plurality of file chunks is obtained in order to decrypt the encrypted file chunk in an operation 804. In some embodiments, a user associated with the requesting device is asked for a passcode that may be used to access the security key. For example, in response to receiving the request for the file 100, a user associated with the device 124 may be asked for a passcode. If the user provides the proper passcode, the security key associated with the file chunk 102 is obtained in the operation 804.

After the security key is obtained in the operation 804, a storage location of the first file chunk is determined and the first file chunk of the plurality of file chunks is decrypted in operations 806 and 808. In some embodiments of the present disclosure, in addition to providing a passcode to obtain the security key, a passcode may also be required to obtain the storage location of any file chunk, such as the first file chunk. Thus, during the operation 806, a user associated with the requesting device is asked for a passcode that may be used to access the storage location of any file chunk, including the first file chunk. Turning back to the example, if the device 124 requests the file 100, the device 124 determines that the file chunk 102 is stored at the device 120. In this example, the device 124 determines that the file chunk 102 is stored at the device 120 by accessing the metadata file 144. Furthermore, in the example, the file chunk 102 is encrypted in accordance with the SSL protocol. Thus, the security key obtained in the operation 804 is used to decrypt to file chunk 102 in the operation 808.

After the file chunk is decrypted, a determination is made if the file includes additional file chunks in an operation 810. In one embodiment of the present disclosure, the metadata file indicates what file chunks comprise the requested file. Returning to the example, during the operation 810, the device 124 accesses the metadata file 144 and in particular the file ID 146 and determines that additional file chunks, namely the file chunk 104, comprise the file 100.

Returning to the method 800, if a determination is made that the file includes an additional file chunk, an operation 812 is performed where a determination is made if the additional file chunk requires a new security key. In some embodiments of the present disclosure, the security key obtained in the operation 804 may be used to decrypt all of the file chunks that comprise a file. In further embodiments of the present disclosure, the security key obtained in the operation 804 may be used to decrypt some of the file chunks but not all of the file chunks. In still further embodiments, in the operation 804, the user may be required to provide a password for the new security key prior to gaining access to the new security key.

In some embodiments of the present disclosure, when the first file chunk is decrypted, the user not only gains access to the file chunk, the user also gains access to a security key that is necessary to decrypt the next file chunk. To further illustrate, the security key 118 in the file chunk 102 that is accessed upon decryption of the file chunk 102 may be the security key that is used to unencrypt the file chunk 104. Turning back to the example, in the operation 812, the device 124 determines that the file chunk 104 requires a new security key that is different from the security key used to decrypt the file chunk 102.

If a determination is made in the operation 812 that the additional file chunk requires a new security key, the method repeats the operation 804 as described above. In one embodiment, when the operation 804 is repeated, a user associated with the requesting device may be asked for a passcode that may be used to access the security key for the additional file chunk. In an alternative embodiment, the first file chunk may store the security key for the additional file chunk. In a further embodiment, when the requesting device accesses the first file chunk, the requesting device obtains the security key for the additional file chunk. Returning to the example, when the device 124 accesses the file chunk 102, the device 124 also accesses the security key 118 for the file chunk 104. Thus, in this example, the file chunk 102 has the security key for the file chunk 104 such that when the device 124 accesses the file chunk 102, the device 124 obtains the security key for the file chunk 104 during the operation 804.

After the requesting device obtains the security key for the additional file chunk in the operation 804, the requesting device determines the storage location for the additional chunk in the operation 806. In one embodiment, the storage location for the additional chunk is determined as detailed above. In an alternative embodiment, the first the chunk may have the storage location for the additional file chunk. In this embodiment, when the requesting device accesses the first file chunk, the requesting device obtains the storage location for the additional file chunk. Returning to the example, when the device 124 accesses the file chunk 102, the device 124 also accesses the storage location for the file chunk 104, which in this example is the device 122. Once the storage location is obtained for the additional file chunk, the additional file chunk is decrypted in the operation 808 as described above and a determination is made if the file includes an additional file chunk in operation 810, also as described above. Returning to the example, in the operation 810, the device 124 determines that the file 100 has another file chunk, the file chunk 106, and proceeds to the operation 812. However, in this example, the security key used to decrypt the file chunk 104 may also be used to decrypt the file chunk 106. Therefore, the file chunk 106 does not require a new security key and an operation 814 is performed.

In the operation 814, a storage location of the additional file chunk is determined, as discussed above with reference to the operation 806. Turning back to the example, when the client device accesses the file chunk 104, the client device accesses the location information 116. In this example, the location information indicates that the file chunk 106 is stored at the device 122. Thus, the device 124 obtains the file chunk 106 from the device 122 and performs the operation 810.

In the operation 810, once a determination is made that the file does not include additional file chunks, the method 800 proceeds to an operation 816, where the file is assembled. Returning to the example, the device 124 repeats the operations 804-816 for the remaining file chunks 108 and 110, and then assembles the file 100 with the file chunks 102-110 in the operation 816. It should be noted that while the method 800 has been described from the perspective of a client device, such as the device 124, the method 800 may also be performed from a server device, such as the webserver 142.

Figure 9:
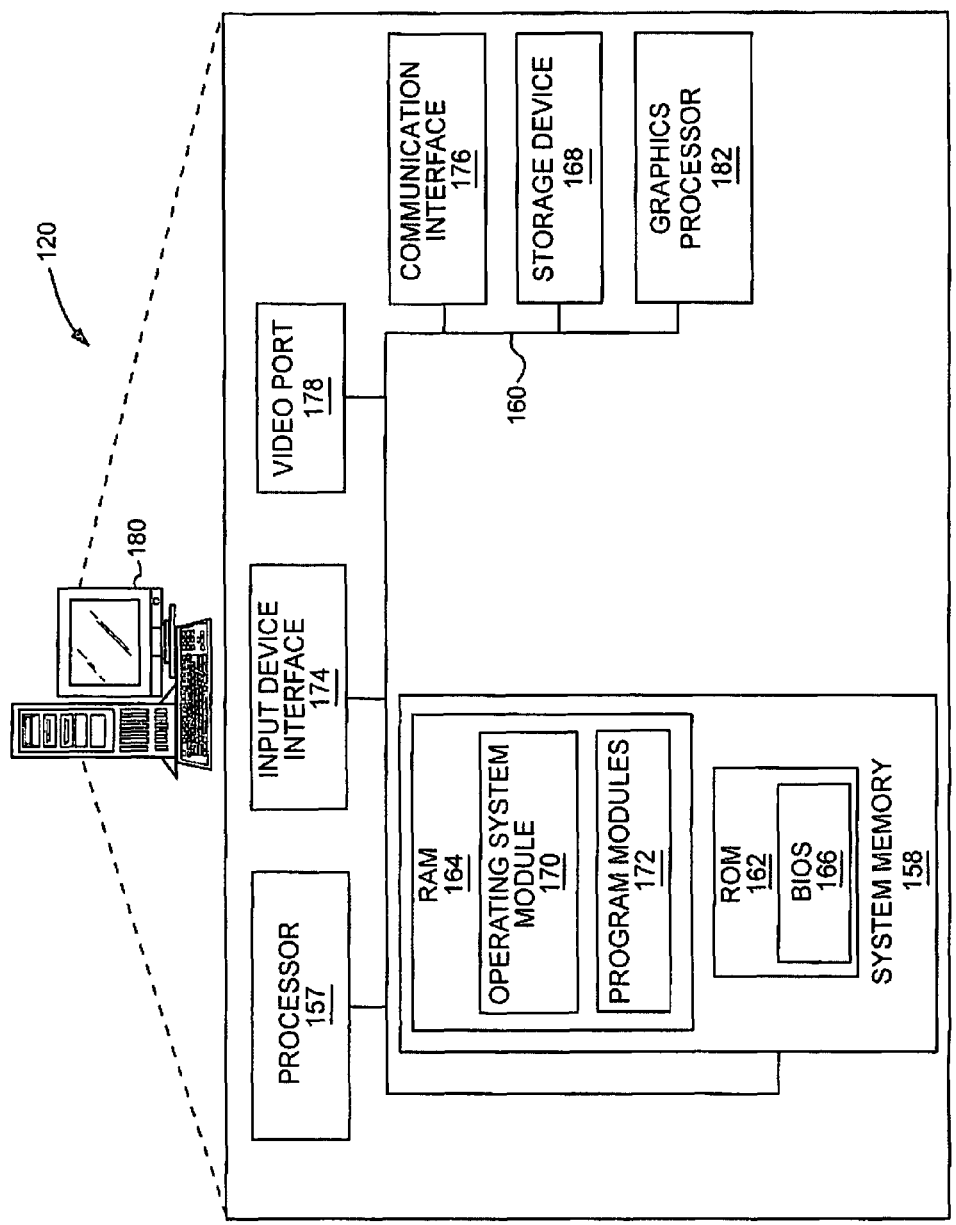
FIG. 9 is a block diagram of a client device according to one embodiment of the present disclosure.

FIG. 9 is a block diagram of the device 120 according to one embodiment of the present disclosure. It should be noted that while this discussion focuses on the device 120, this description is equally applicable to the devices 122 and 124, where the devices 122 and 124 include identical components having identical functionality. Moreover the description in FIG. 9 is also applicable to the webserver 142, where the webserver 142 includes the necessary components to operate as a hardware server and may or may not include all the components discussed with reference to FIG. 9, such as a display device and various input devices, or the like. The device 120 may comprise any computing or processing device capable of executing software instructions to implement the functionality described herein, such as, by way of non-limiting example, a work station, a desktop or laptop computer, a tablet computer, or the like. The device 120 includes a processor 157, a system memory 158, and a system bus 160. The system bus 160 provides an interface for system components including, but not limited to, the system memory 158 and the processor 157. The processor 157 may be any commercially available or proprietary processor. Dual microprocessors and other multi-processor architectures may also be employed as the processor 157.

The system bus 160 may be any of several types of bus structures that may further interconnect to a memory bus (with or without a memory controller), a peripheral bus, and/or a local bus using any of a variety of commercially available bus architectures. The system memory 158 may include non-volatile memory 162 (e.g., read only memory (ROM), erasable programmable read only memory (EPROM), electrically erasable programmable read only memory (EEPROM), etc.) and/or volatile memory 164 (e.g., random access memory (RAM)). A basic input/output system (BIOS) 166 may be stored in the non-volatile memory 162, and can include the basic routines that help to transfer information between elements within the device 120. The volatile memory 164 may also include a high-speed RAM, such as static RAM, for caching data.

The device 120 may further include the computer-readable storage device 168, which may comprise, by way of non-limiting example, an internal hard disk drive (HDD) (for example, an enhanced integrated drive electronics (EIDE) HDD or serial advanced technology attachment (SATA) HDD), a flash memory, or the like. The computer-readable storage device 168 and other drives, sometimes referred to as computer-readable or computer-usable media, provide nonvolatile storage of data, data structures, computer-executable instructions, and the like. Although for purposes of illustration the description of the computer-readable storage device 168 above refers to a HDD, it should be appreciated by those skilled in the art that other types of media which are readable by a computer, such as zip disks, magnetic cassettes, flash memory cards, cartridges, a Universal Serial Bus memory stick, and the like, may also be used in the operating environment, and further, that any such media may contain computer-executable instructions for performing novel functionality as disclosed herein.

A number of modules can be stored in the computer-readable storage device 168 and in the volatile memory 164, including an operating system module 170 and one or more program modules 172, which may implement the functionality described herein in whole or in part. It is to be appreciated that the embodiments can be implemented with various commercially available operating system modules 170 or combinations of operating system modules 170.

All or a portion of the embodiments may be implemented as a computer program product stored on a non-transitory computer-usable or computer-readable storage medium, such as the computer-readable storage device 168, which may include complex programming instructions, such as complex computer-readable program code, configured to cause the processor 157 to carry out the functionality described herein. Thus, the computer-readable program code can comprise software instructions for implementing the functionality of the embodiments described herein when executed on the processor 157. The processor 157, in conjunction with the program modules 172 in the volatile memory 164, may serve as a control system for the device 120 that is configured to or adapted to implement the functionality described herein.

A user may be able to enter commands and information into the device 120 through one or more input devices, such as, for example, a keyboard (not illustrated), a pointing device such as a mouse (not illustrated), a touch-sensitive surface (not illustrated), or the like. Other input devices may include a microphone, an infrared (IR) remote control, a joystick, a game pad, a stylus pen, or the like. These and other input devices may be connected to the processor 157 through an input device interface 174 that is coupled to the system bus 160, but can be connected by other interfaces such as a parallel port, an Institute of Electrical and Electronic Engineers (IEEE) 1394 serial port, a Universal Serial Bus (USB) port, an IR interface, and the like.

The device 120 may also include a communication interface 176 suitable for communicating with a network. The device 120 may also include a video port 178 that drives the display device 180. The video port 178 may receive imagery, such as water surface imagery, from a graphics processor 182. The display device 180 may be separate from the device 120, or may be integrated with the device. Non-limiting examples of the display device 180 include an LCD or plasma monitor, a projector, or a head-mounted display.

Those skilled in the art will recognize improvements and modifications to the preferred embodiments of the present disclosure. All such improvements and modifications are considered within the scope of the concepts disclosed herein and the claims that follow.

What is claimed is:

1. A computer implemented method of storing a file comprising:
   receiving the file at a first location;
   splitting the file into a plurality of file chunks;
   encrypting each file chunk of the plurality of file chunks;
   generating a first security key for a first encrypted file chunk of the plurality of encrypted file chunks, where first encrypted file chunk is encrypted with a first security type and the first security key decrypts the first encrypted file chunk according to the first security type;
   generating a second security key different from the first security key for a second encrypted file chunk of the plurality of encrypted file chunks, where the second encrypted file chunk is encrypted with a second security type different from the first security type and the second security key decrypts the second encrypted file chunk according to the second security type; and
   storing the second security key with the first encrypted file chunk such that when the first encrypted file chunk is decrypted with the first security key, access is gained to the second security key;
   storing ones of the plurality of encrypted file chunks at a second location separate and distinct from the first location;
   receiving a request to access the file;
   obtaining the first security key;
   determining a storage location of the first encrypted file chunk of the plurality of encrypted file chunks;
   decrypting the first encrypted file chunk of the plurality of encrypted file chunks using the first security key;
   accessing the first encrypted file chunk, wherein the first encrypted file chunk includes storage location information corresponding to a storage location of the second encrypted file chunk;
   obtaining the second security key and the storage location information from the first encrypted file chunk;
   decrypting the second encrypted file chunk using the second security key and the storage location information; and
   assembling the file using the decrypted first file chunk and the decrypted second file chunk.

2. The computer implemented method as recited in claim 1, further comprising:
   generating a metadata file, the metadata file comprising:
      location information corresponding to the first location and the second location; and
      an ordering of file chunks of the plurality of file chunks, wherein the ordering of the file chunks corresponds to the file.

3. The computer implemented method as recited in claim 1, wherein the second security key decrypts a third encrypted file chunk of the plurality of encrypted file chunks.

4. The computer implemented method as recited in claim 1, wherein the first security key decrypts a third encrypted file chunk of the plurality of encrypted file chunks.

5. The computer implemented method as recited in claim 1, wherein obtaining the first security further comprises:
   requesting a passcode in response to receiving the request to access the file;
   receiving a response to the passcode request; and
   obtaining the first security key based on the response to the passcode request.

6. The computer implemented method as recited in claim 1, wherein determining the storage location of the first encrypted file chunk of the plurality of encrypted file chunks further comprises:
   requesting a passcode;
   receiving a response to the passcode request; and
   determining the storage location of the first encrypted file chunk of the plurality of encrypted file chunks based on the response to the passcode request.

7. The computer implemented method as recited in claim 1, the method further comprising:
   associating a checksum/hash with each chunked file.

8. A non-transitory computer readable medium storing software for instructing a controller of a computing device to:
   receive a file at a first location;
   split the file into a plurality of file chunks;
   encrypt each file chunk of the plurality of file chunks;
   generate a first security key for a first encrypted file chunk of the plurality of encrypted file chunks, where the first encrypted file chunk is encrypted with a first security type and the first security key decrypts the first encrypted file chunk according to a first security type;
   generate a second security key different from the first security key for a second encrypted file chunk of the plurality of encrypted file chunks, where the second encrypted file chunk is encrypted with a second security type different from the first security type and the second security key decrypts the second encrypted file chunk;
   store the second security key with the first encrypted file chunk such that when the first encrypted file chunk is decrypted with the first security key, access is gained to the second security key;
   store ones of the plurality of encrypted file chunks at a second location separate and distinct from the first location;
   receive a request to access the file;
   obtain the first security key;
   determine a storage location of the first encrypted file chunk of the plurality of encrypted file chunks;
   decrypt the first encrypted file chunk of the plurality of encrypted file chunks using the first security key;
   access the first encrypted file chunk, wherein the first encrypted file chunk includes storage location information corresponding to a storage location of the second encrypted file chunk;
   obtain the second security key and the storage location information from the first encrypted file chunk;
   decrypt the second encrypted file chunk using the second security key and the storage location information; and
   assemble the file using the decrypted first file chunk and the decrypted second file chunk.

9. The non-transitory computer readable medium as recited in claim 8, wherein the software further instructs the controller of the computing device to:
   generate a metadata file, the metadata file comprising:
      location information corresponding to the first location and the second location; and an ordering of file chunks of the plurality of file chunks, wherein the ordering of the file chunks corresponds to the file.

10. The non-transitory computer readable medium as recited in claim 8, wherein the second security key decrypts a third encrypted file chunk of the plurality of encrypted file chunks.

11. The non-transitory computer readable medium as recited in claim 8, wherein the first security key decrypts a third encrypted file chunk of the plurality of encrypted file chunks.

12. The non-transitory computer readable medium as recited in claim 8, wherein the software further instructs the controller of the computing device to:
    request a passcode in response to receiving the request to access the file;
    receive a response to the passcode request; and
    obtain the first security key based on the response to the passcode request.

13. The non-transitory computer readable medium as recited in claim 8, wherein the software further instructs the controller of the computing device to:
    request a passcode;
    receive a response to the passcode request; and
    determine the storage location of the first encrypted file chunk of the plurality of encrypted file chunks based on the response to the passcode request.

\* \* \* \* \*